(12) United States Patent  
Sanchez et al.

(10) Patent No.: US 8,337,139 B2
(45) Date of Patent: Dec. 25, 2012

(54) METHOD AND SYSTEM FOR REDUCING THE IMPACT ON THE PERFORMANCE OF A TURBOMACHINE OPERATING AN EXTRACTION SYSTEM

(75) Inventors: Nestor Hernandez Sanchez, Schenectady, NY (US); David A. Stasenko, Albany, NY (US)

(73) Assignee: General Electric Company, Schenectady, NY (US)

( * ) Notice: Subject to any disclaimer, the term of this patent is extended or adjusted under 35 U.S.C. 154(b) by 713 days.

(21) Appl. No.: 12/615,306

(22) Filed: Nov. 10, 2009

(65) Prior Publication Data

US 2011/0110759 A1  May 12, 2011

(51) Int. Cl.
*F04D 27/02* (2006.01)
(52) U.S. Cl. .................... 415/1; 60/782; 60/785
(58) Field of Classification Search .......... 60/782, 60/785, 806; 415/1, 13
See application file for complete search history.

(56) References Cited

U.S. PATENT DOCUMENTS

| | | | |
|---|---|---|---|
| 3,742,709 A | 7/1973 | Dolezal | |
| 4,715,185 A | 12/1987 | Salo | |
| 5,201,180 A | 4/1993 | Girbig | |
| 6,233,939 B1 | 5/2001 | Ngo-Beelmann et al. | |
| 2007/0137213 A1* | 6/2007 | Rickert et al. | 60/782 |
| 2008/0075578 A1 | 3/2008 | Burdgick et al. | |
| 2012/0117977 A1* | 5/2012 | Childers et al. | 60/782 |

\* cited by examiner

*Primary Examiner* — Dwayne J White
(74) *Attorney, Agent, or Firm* — Ernest G. Cusick; Frank A. Landgraff (57) ABSTRACT

A method and system for increasing the efficiency of a turbomachine having an extraction system is provided. The extraction system may have multiple extraction ports from which the working fluid of the turbomachine is extracted to meet extraction load requirements of an independent process. The method and system may enable a control system to optimally determine the which extraction ports to draw the working fluid from for meeting the extraction load requirement. The optimal location may be determined by utilizing the data on the load requirement, where the extraction load requirement may be operationally distinct from the turbomachine load.

20 Claims, 4 Drawing Sheets

METHOD AND SYSTEM FOR REDUCING THE IMPACT ON THE PERFORMANCE OF A TURBOMACHINE OPERATING AN EXTRACTION SYSTEM

BACKGROUND OF THE INVENTION

The present invention relates to turbomachines with extraction systems; and more particularly to a method and a system for reducing the impact on the efficiency of a turbomachine when the extraction system is in operation.

The turbomachines include for example, but not limiting of, a steam turbine, a gas turbine, or the like. The turbomachines may employ an extraction system to remove some of the turbomachine working fluid (steam, or the like) for use in an independent process. The independent process may include, but is not limited to, district heating applications, chemical process, coal gasification, oil heating and atomization, or the like. The extraction system may be required to meet an extraction load requirement of the independent process. The extraction load requirement may include a physical characteristic such as, but not limiting of, pressure, temperature, flow rate of the fluid, and the like.

The extraction load requirement may not be directly related to the turbomachine cycle. The extraction load requirement is generally de-coupled from the variations in the turbomachine load. The turbomachine load may correspond to an electrical and/or a mechanical load. The difference in the extraction load requirement and the turbomachine load may lead to performance and efficiency degradations of the turbomachine. Here, the turbomachine may require attemperation and throttling, to match the extraction load requirement.

There are a few concerns with the currently known methods and systems used for reducing the impact of the efficiency and the performance on a turbomachine operating an extraction system. For example, steam is extracted from a steam turbine at an extraction port that may be located at a fixed high-pressure location; which is typically the steam turbine inlet. As the steam turbine load varies, there may be high performance losses since the steam is not allowed to expand before extraction.

In other methods and systems, a control stage is introduced in order to maintain a constant extraction pressure as steam turbine load varies. Here though, the control stage may also lead to a significant performance loss.

For the foregoing reasons, there is a desire for a method and a system for minimizing the typical performance losses associated with conventional extraction systems. The method and the system should maximize process flexibility, and reduce the impact on the efficiency of the turbomachine operation the extracting system. The method and the system should determine, in near real-time, which of the several distinct extraction location on the turbomachine may be optimum for at a given load requirement.

BRIEF DESCRIPTION OF THE INVENTION

In accordance with an embodiment of the present invention, a method for improving the turndown efficiency of a turbomachine, wherein the turbomachine comprises of an extraction system having a plurality of ports; the method comprising determining an extraction load requirement comprising a physical requirement of a fluid extracted from the turbomachine by the extraction system; determining a turbomachine load requirement and selecting an optimum port from the plurality of ports, wherein the step of selecting an optimum port comprises of utilizing data on the turbomachine load requirement, wherein the extraction load requirement is determined by an extraction process which is independent of the turbomachine load requirement.

In accordance with an alternate embodiment of the present invention, a method for reducing the impact on performance of a power-plant comprising an extraction system, wherein the power-plant comprises of a steam power-plant, wherein the steam power-plant is integrated with an extraction system configured for transferring steam from the steam plant to an independent process, wherein the extraction system comprises a plurality of ports, the method comprising: determining an extraction load requirement comprising a physical requirement of the steam extracted from the steam power-plant by the extraction system; determining an energy demand of the steam plant and selecting an optimum port from the plurality of ports on the steam power-plant for extracting the steam, wherein the step of selecting the optimum port comprises of utilizing data on the energy demand and the extraction load requirement, wherein the extraction load requirement is determined, by an independent process, which is operationally distinct from the energy demand.

In accordance with another alternate embodiment of the present invention, a system for increasing the turndown efficiency of a turbomachine, wherein the turbomachine comprises of an extraction system with multiple extraction ports located throughout the turbomachine, and a control system configured for determining an extraction load requirement comprising a physical requirement of a fluid extracted from the turbomachine by the extraction system; determining a load requirement of the turbomachine; and determining an optimum extraction port of the multiple extraction ports, wherein the step of determining the optimum extraction port comprises of utilizing data on the load requirement, wherein the extraction load requirement is determined by an extraction process which is independent of the turbomachine load requirement.

DETAILED DESCRIPTION OF THE INVENTION

The following detailed description of preferred embodiments refers to the accompanying drawings, which illustrate specific embodiments of the present invention. Other embodiments having different structures and operations do not depart from the scope of the present invention.

The terminology used herein after is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Certain terminology is used herein for convenience of the reader only and is not to be taken as a limitation on the scope of the invention. For example, words such as "upper," "lower," "left," "right," "horizontal," "vertical," "upward," "downward", and the like; merely describe the configuration shown in the FIGURES. Indeed, the element or elements of an embodiment of the present invention may be oriented in any direction and the terminology, therefore, should be understood as encompassing such variations unless specified otherwise.

The present invention has the technical effect of reduce the impact on the performance of a turbomachine operating an extraction system.

Turbomachines employing extraction systems are widely used in industrial applications. Working fluid is extracted from various stages of the turbomachine and used for an independent process such as, but not limited to: district heating applications, chemical process, coal gasification, oil heating & atomization, food and beverage processing, etc.

The present invention may be applied to variety of turbomachines that produce a gaseous fluid, such as, but not limiting of: a steam turbine, a gas turbine, or the like. An embodiment of the present invention may be applied to either a single steam turbine or a plurality of steam turbines.

Figure 1:
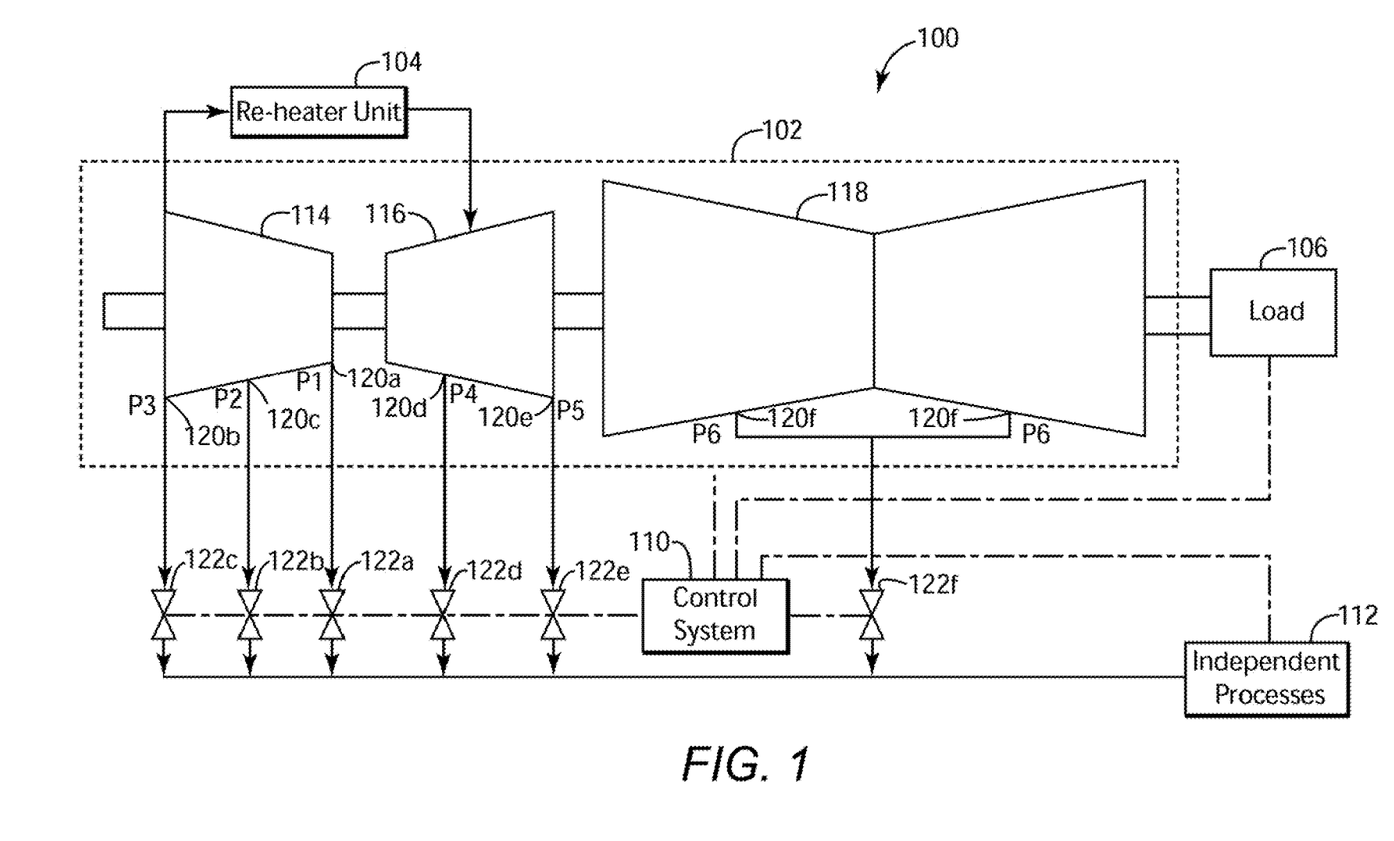
FIG. 1 is a schematic illustrating a turbomachine deployed in a power-plant site, in accordance with an embodiment of the present invention.

Referring now to the FIGURES, where the various numbers represent like elements throughout the several views, FIG. 1 is a schematic illustrating a turbomachine deployed in a site, such as, but not limiting of: a power-plant 100. FIG. 1 illustrates the power-plant 100 having the turbomachine 102, a re-heater unit 104, a load 106, an extraction system 108, a control system 110 and independent process 112. Alternatively, the present invention may be integrated with a site not having the re-heater unit 104. In an exemplary embodiment, the turbomachine 102 illustrated in the FIG. 1 is a steam turbine 102. Further, in an embodiment of the present invention, the power-plant 100 may be a steam power-plant 100.

As illustrated in the FIG. 1, the steam turbine 102 comprises: a High Pressure turbine (HP) 114, an Intermediate Pressure turbine (IP) 116, a Low Pressure turbine (LP) 118. The steam after expansion through the HP turbine 114 may pass through the re-heater unit 104. The re-heater unit 104 adds additional superheat to the steam, before the steam may expand through the IP turbine 116 and subsequently expands through the LP turbine 118. The load 106 may convert the mechanical energy imparted by the rotation of the turbines to useful work, such as, but not limiting of, satisfying a electrical load, mechanical load, or the like. An energy demand of the steam power-plant 100 may be a direct function of the load.

In an embodiment of the present invention, a portion of the steam may be extracted from the steam power-plant 100 for independent process 112, which may not be directly related to the steam power-plant cycle. The independent process 112 may have an extraction load requirement that may include, but is not limited to: steam required for district heating applications, chemical process, coal gasification, oil heating & atomization, food and beverage processing, and the like. Moreover, in an embodiment of the present invention, the extraction load requirement may comprise a physical requirement of steam to be extracted from the steam power-plant 100 in terms of one or more of pressure, temperature, flow rate, etc. In a further embodiment of the present invention, the physical requirement may involve the steam to be extracted at a constant pressure. Also, the extraction load requirement may be operationally distinct from the energy demand of the steam power-plant 100. Thus, the extraction load requirement is generally de-coupled from the variations in the energy demand.

In an embodiment of the present invention, the steam power-plant 100 may be integrated with the extraction system 108 for removing a portion of the steam from the steam power-plant 100 to for use by the independent process 112. In an embodiment of the present invention, the extraction system 108 may be located on the steam turbine 102 of the steam power-plant 100.

As illustrated in the FIG. 1, the extraction system 108 comprises: multiple steam extraction ports 120$a$-$f$ and the corresponding servo valves 122$a$-$f$. In an embodiment of the present invention, the extraction ports 120$a$-$f$ may be located at physically distinct locations on the steam turbine 102. Further, each extraction port 120$a$-$f$, for any particular operating conditions (i.e. for any specific energy demand of steam power-plant 100), may correspond to different steam pressures. Moreover, since the extraction ports 120$a$-$f$ may be located at physically distinct locations, the pressure exerted by the steam at each extraction port 120$a$-$f$ may be unique compared to the other extraction ports 120$a$-$f$. In an embodiment of the present invention, each of the extraction ports 120$a$-$f$ may be equipped with one or more sensors (not illustrated in the FIGS.) to determine the pressure exerted by each extraction port 120$a$-$f$ in any particular operating condition.

There may be few limitations on the number of extraction ports 120$a$-$f$ that may be used in the extraction system 108. The amount of extraction ports 120$a$-$f$ illustrated in FIG. 1 is not intended to limit the scope of the present invention.

In an embodiment of the present invention, the extraction system valves 122$a$-$f$ may be servo valves, actuated by the means of electrical signals. The servo valves may be configured to operate in two states: a fully-closed state and a fully-open state. Here, the open state may correspond to the steam being extracted from the corresponding extraction ports 120$a$-$f$.

In an embodiment of the present invention, the power-plant 100, the independent process 112 and the extraction system 108 may be communicatively coupled to the control system 110. In an embodiment of the present invention, the control system 110 may be configured to determine the extraction load requirement, which may include the physical requirement of the steam required to be extracted from the steam power-plant 100. Further, in another embodiment of the present invention, the control system 110 may be configured to determine the energy demand of the steam power-plant 100.

The control system 110 may determine the extraction load requirement by means of one or more sensors and/or transducers (not illustrated in the FIGS.) that may be integrated with the independent process 112 and communicatively coupled with the control system 110. The energy demand of the steam power-plant 100 may be directly dependent on the amount of electricity required to be generated. The control system 110 may be capable of calculating the load requirement of the steam power-plant 100, and received data from one or more sensors and transducers (not illustrated in the FIGS.) that may be integrated with the steam power-plant 100.

As illustrated in the FIG. 1, there may be multiple extraction ports 120$a$-$f$ from which the steam may be extracted. Further, the inlet pressure of the steam may be a function of the energy demand of the steam power-plant 100. Thus, the pressure exerted by each of the extraction port 120$a$-$f$ may also change with variation in the energy demand of the steam power-plant 100. In an embodiment of the present invention, the control system 110 may select different extraction ports 120*a-f* as the energy demand of the steam power-plant 100 varies. In an embodiment of the present invention, the control system 110 may utilize data on the energy demand of the steam power-plant 100 and the extraction load requirement of the independent process 112 to optimally determine the extraction ports 120*a-f* for extracting the steam from the steam power-plant 100. Here, the control system 110 may determine the extraction port 120*a-f* that may correspond to a lowest pressure feasible, at a particular operating condition, in order to meet the extraction load requirement. For example, but not limiting of, in a case of maximum driven load 106, the lowest feasible extraction pressure may correspond to the extraction port 120*f*. However, when the driven load 106 decreases, the lowest feasible pressure may correspond to the extraction port 120*b*. This may allow the steam to expand through the steam turbine 102; which may reduce the impact on the performance on the steam turbine 102.

Moreover, in an embodiment of the present invention, the control system 110 may be configured to utilize a pressure cascading process. This may determine which of the multiple extraction ports 120*a-f* to use for supplying the steam for the extraction load requirement and the energy demand of the steam power-plant 100. For example, but not limiting of, in case of the maximum energy demand, the control system 110 may select multiple extraction ports 102*a-f* at lower pressure level in order to achieve the objective of extracting the steam with lowest feasible pressure and simultaneously meet the extraction load requirements. However, when the energy demand decreases, the control system 110 may select multiple extraction ports 120*a-f* at a higher pressure level to meet the same extraction load requirements.

The physical requirement of the steam for the independent process 112 may correspond to a constant pressure of the steam. In an embodiment of the present invention, the control system 110 may be configured to determine which of the multiple extraction ports 120*a-f* may be used to provide the steam at constant pressure and while meeting the energy demand of the steam power-plant 100. Moreover, the multiple extraction ports 120*a-f* may be optimally selected to have the least impact on the efficiency of the steam turbine 102. In an embodiment of the present invention, the control system 110 may continuously perform the cascading process as the steam power-plant 100 operates. This may allow for the extraction of the steam over a wide range of operating conditions and thus, maximizes the process flexibility and provides improved turndown capabilities.

In an embodiment of the present invention, the control system 110 may be configured to cascade additional steam flow from the end packing leak-off lines (not illustrated in the FIGS.) of the steam turbine 102 into the extraction system 108. This may result in an additional performance benefit, as lesser steam may have to be extracted from the steam turbine 102.

As will he appreciated, the present invention may be, embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium.

Any suitable computer readable medium may be utilized. The computer-usable or computer-readable medium may be, for example but not limiting of, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those. supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block.

The present invention may include the control system 110, or the like, that has the technical effect of automatically selecting an optimum port of a plurality extraction ports 120a-f from which a portion of the steam is required to be extracted for the independent process 112. Further, the present invention may be configured to continuously operate the turbomachine 102 while extraction of steam takes place. Alternatively, the control system 110 may be configured to require a user action to the initiate operation. An embodiment of the control system 110 of the present invention may function as a stand-alone system. Alternatively, the control system 110 may be integrated as a module, or the like, within a broader system, such as a turbomachine control or a steam power-plant control system. For example, but not limiting of, the control system 110 of the present invention may be integrated with the control system 110 operating the turbomachine 102 having the extraction system 108.

Figure 2:
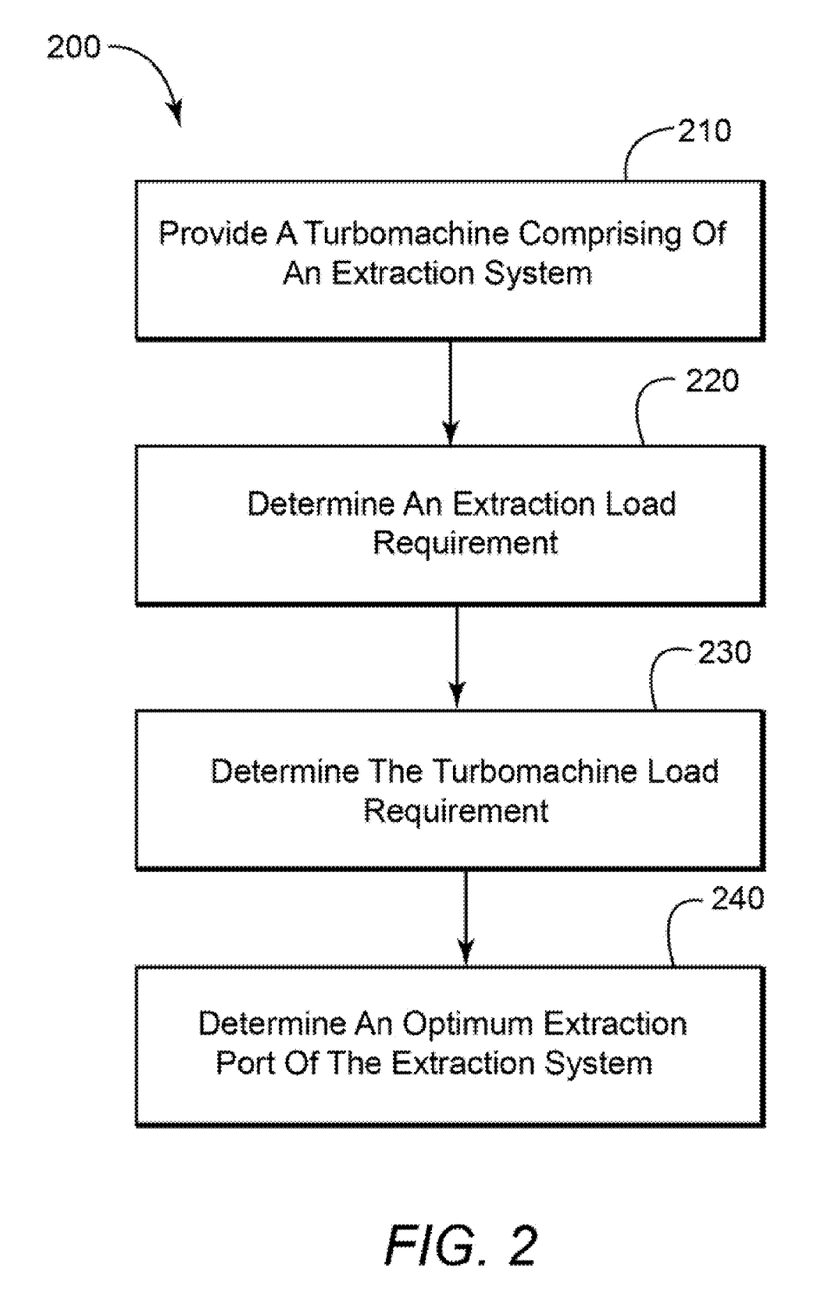
FIG. 2 is a flowchart illustrating an example of a method for optimally determining extraction ports, in accordance with an embodiment of the present invention.

Referring now to FIG. 2, which is a flowchart illustrating an example of a method 200 for optimally determining extraction ports 120a-f for increasing the efficiency of the turbomachine 102, in accordance with an embodiment of the present invention. In an embodiment of the present invention, the control system 110, which may operate with pre-programmed logic, may navigate though the method 200 as described below. In an embodiment of the present invention, the control system 110 may be integrated with a Graphic User Interface (GUI), or the like. The GUI may enable the operator of the control system 110 to navigate through the method 200.

In step 210, the method 200 may be provided with the turbomachine 102 having the extraction system 108. The turbomachine 102 may include all types of engines such as, but not limiting of: a steam turbine, a gas turbine, or the like. In an embodiment of the present invention, the extraction system 108 may comprise multiple extraction ports 120a-f integrated with the turbomachine 102 at different physical locations. In an embodiment of the present invention, each of the extraction ports 120a-f may have corresponding servo valves 122a-f for actuating the extraction ports 120a-f. Further, the inlet pressure of the fluid in the turbomachine 102 may be a direct function of the turbomachine load. Thus, the pressure exerted by each of the extraction ports 120a-f may change with variation in the turbomachine load.

The extraction system 108 as explained in FIG. 1 may be required for removing a portion of the fluid flowing through the turbomachine 102 for the independent process 112. Generally, the independent process 112 are not dependent on the turbomachine cycle and thus, the extraction load requirements of the independent process 112 may be de-coupled from the turbomachine load. For example, in case of a steam-turbine 102, the extraction system 108 removes a portion of the steam flowing through the steam turbine 102 for the independent process 112 such as, but not limiting of: district heating applications, chemical process, coal gasification, oil heating & atomization, food and beverage processing, and the like In step 220, the method 200 may determine the extraction load requirement of the independent process 112. The extraction load requirement may comprise a physical requirement of fluid to match the needs of the independent process 112. The physical requirement may include at least one of pressure, temperature, flow rate, or combinations thereof. The method 200 may configure the control system 110 to determine the physical requirement of fluid for the independent process 112. In an embodiment of the present invention, the control system 110 may be communicatively coupled to the independent process 112 and may determine the physical requirement of the fluid by employing one or more sensors and transducers (not illustrated in the FIGS.). Moreover, in an embodiment of the present invention, the independent process 112 may require the fluid to be extracted at constant pressure from the extraction system 108. In an alternate embodiment of the present invention, the method 200 may receive data on the extraction load requirement from an independent third-party source. In another alternate embodiment of the present invention, the method 200 incorporates a default value, or range of values, for the extraction load requirement.

In step 230, the method 200 may determine the turbomachine load requirement. The turbomachine load requirement may be directly dependent on the electrical load or mechanical drive required to be generated. The method 200 may enable the control system 110 to calculate the turbomachine load requirement from an electrical signal, received from one or more sensors and transducers (not illustrated in the FIGS.) that may be integrated with the turbomachine 102.

In step 240, the method 200 may utilize the data on extraction load requirement and data on the turbomachine load to determine an optimum location of extraction port 120a-f from which the fluid should be extracted. The method 200 may enable the control system 110 to determine the optimum extraction port that may reduce the impact on the efficiency of the turbomachine 102; while the extraction system operates. In an embodiment of the present invention, the method 200 may select different extraction ports 120a-f as a function of the variation of the turbomachine load. For improving the efficiency of the turbomachine 102, the control system 110 may select the extraction port 120a-f, which may correspond to the lowest pressure feasible at any particular operating condition to match the extraction load requirement. For example, but not limiting of, with the maximum steam turbine load, the lowest feasible pressure may correspond to the extraction port available at the LP turbine 118. However, when the steam turbine load decreases, the lowest feasible pressure may correspond to the extraction port available at the HP turbine 116. This may allow the steam to expand through the steam turbine 102 and thus, may improve the overall efficiency of the steam turbine 102.

Moreover, in an embodiment of the present invention, the method 200 may enable the control system 110 to utilize a pressure cascading process to select which of the multiple extraction ports 120a-f to use to meet the extraction load requirement and simultaneously meet the turbomachine load. For example, but not limiting of, with the maximum turbomachine load, the method 200 may select multiple extraction ports 120a-f at lower pressure level to extract the steam with lowest feasible pressure and meet the extraction load requirements. However, when the turbomachine load decreases, the method may select multiple extraction ports 120a-f at higher pressure level in order to meet the extraction load requirements.

In an embodiment of the present invention, the physical requirement of the fluid for independent process 112 may correspond to a constant pressure of the fluid. In an embodiment of the present invention, the method 200 may enable the control system 110 to determine which of the multiple extraction ports 120a-f may be used to provide the fluid at constant pressure and simultaneously meet the turbomachine load. Moreover, the multiple extraction ports 120a-f may be optimally selected to have the least impact on the performance of the turbomachine 102. In an embodiment of the present invention, the method 200 may continuously perform the cascading process as the turbomachine 102 operates. This may allow the extraction of the fluid over a wide range of operating conditions and thus, may maximize the flexibility of the method 200 and provide improved turndown capabilities.

Figure 3:
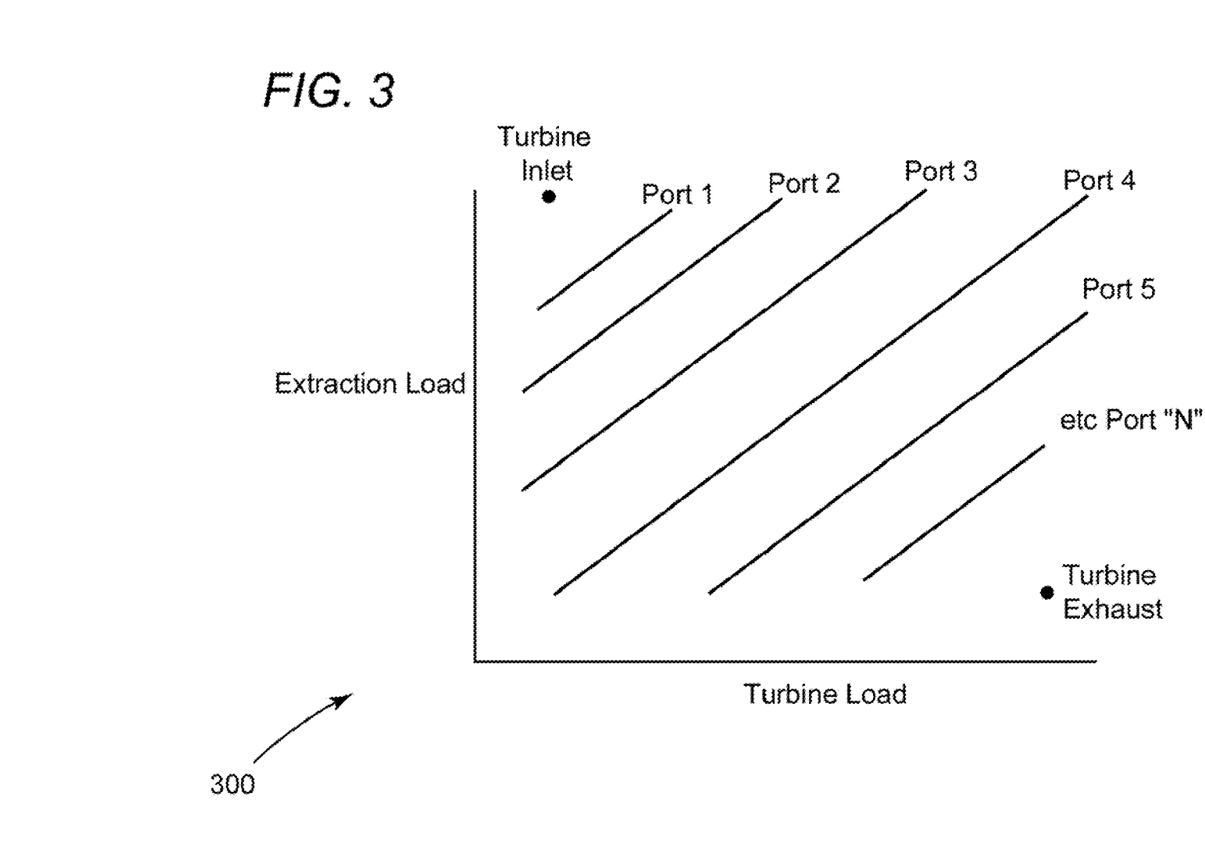
FIG. 3 is a schematic illustrating the functional relationship between the turbomachine load and the extraction load, in accordance with an embodiment of the present invention.

FIG. 3 is a plot 300 illustrating the functional relationship between the turbomachine load and the extraction load, in accordance with an embodiment of the present invention.

As illustrated in the plot 300, the optimum extraction port is a function of the steam turbine load. Thus, the selection of the optimum extraction port to match the extraction load demand may become a function of the steam turbine load. In order to reduce the impact on the performance of the turbomachine 102, the optimum determination of the extraction ports 120*a-f* may correspond to lowest feasible pressure, which can meet the extraction load requirements. Thus, during the maximum steam turbine load the optimum extraction port may move towards lower pressure level. Similarly, during the minimum steam turbine load, the optimum extraction port may move up towards higher pressure level to match the same extraction load requirement.

In an exemplary embodiment of the present invention, as shown in the FIG. 1, there may be six extraction ports 120*a-f*, where 120*a* corresponds to the highest pressure (P1) extraction port and 116*f* corresponds to the lowest pressure (P6) extraction port. In an exemplary embodiment of the present invention, if the steam turbine 102 is operating at the highest load, then the optimum port may correspond to the lower pressure level, assume P6 (118*f*) in this case. Similarly, if the steam turbine 102 is operating at minimum load, then to meet the same extraction load requirement the optimum port may move up the pressure level and may use the extraction port 118*a*, corresponding to pressure P1. In an embodiment of the present invention, the optimum port may be determined by a cascading process. The cascading process may be utilized to determine which of the multiple extraction port 120*a-f* should be used at any particular operating condition to meet the extraction load requirements.

Figure 4:
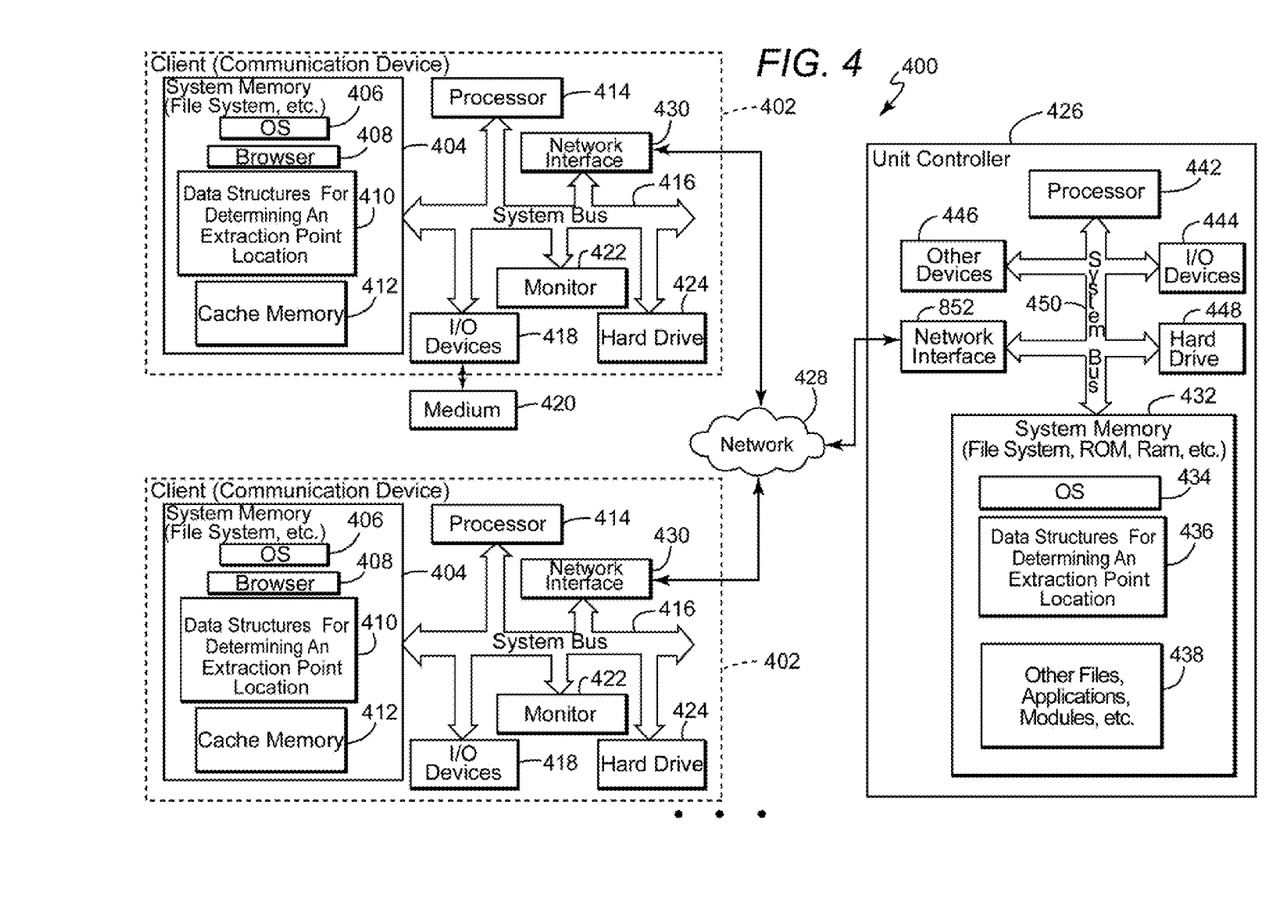
FIG. 4 is a block diagram of an exemplary control system for optimally determining extraction ports, in accordance with an embodiment of the invention.

FIG. 4 is a block diagram of an exemplary control system 110 for optimally determining the extraction port 120*a-f*, in accordance with an embodiment of the present invention. The elements of the method 200 may be embodied in and performed by the system 400. The system 400 may include one or more user or client communication devices 402 or similar systems or devices (two are illustrated in FIG. 4). Each communication device 402 may be for example, but not limiting of, a computer system, a personal digital assistant, a cellular phone, or similar device capable of sending and receiving an electronic message.

The communication device 402 may include a system memory 404 or a local file system. The system memory 404 may include for example, but is not limiting of, a read only memory (ROM) and a random access memory (RAM). The ROM may include a basic input/output system (BIOS). The BIOS may contain basic routines that help to transfer information between elements or components of the communication device 402. The system memory 404 may contain an operating system 406 to control overall operation of the communication device 402. The system memory 404 may also include a browser 408 or web browser. The system memory 404 may also include data structures 410 or computer-executable code for optimally determining the extraction port 120*a-f* that may be similar or include elements of the method 200 in the FIG. 2. The selection is based on utilization of extraction load requirement data and the energy demand data (or turbomachine load data), where the extraction load requirement is not dependent on the variation in the energy demand.

The system memory 404 may further include a template cache memory 412, which may be used in conjunction with the method 200 in FIG. 2 for optimally determining the extraction port 120*a-f*.

The communication device 402 may also include a processor or processing unit 414 to control operations of the other components of the communication device 402. The operating system 406, browser 408, and data structures 410 may be operable on the processing unit 414. The processing unit 414 may be coupled to the memory system 404 and other components of the communication device 402 by a system bus 416.

The communication device 402 may also include multiple input devices (I/O), output devices or combination input/output devices 418. Each input/output device 418 may be coupled to the system bus 416 by an input/output interface (not shown in FIG. 4). The input and output devices or combination I/O devices 418 permit a user to operate and interface with the communication device 402 and to control operation of the browser 408 and data structures 410 to access, operate and control the software to optimally determine the extraction port 120*a-f*. The I/O devices 418 may include a keyboard and computer pointing device or the like to perform the operations discussed herein.

The I/O devices 418 may also include for example, but not limiting of, disk drives, optical, mechanical, magnetic, or infrared input/output devices, modems or the like. The I/O devices 418 may be used to access a storage medium 420. The medium 420 may contain, store, communicate, or transport computer-readable or computer-executable instructions or other information for use by or in connection with a system, such as the communication devices 402.

The communication device 402 may also include or be connected to other devices, such as a display or monitor 422. The monitor 422 may permit the user to interface with the communication device 402.

The communication device 402 may also include a hard drive 424. The hard drive 424 may be coupled to the system bus 416 by a hard drive interface (not shown in FIG. 4). The hard drive 424 may also form part of the local file system or system memory 404. Programs, software, and data may be transferred and exchanged between the system memory 404 and the hard drive 424 for operation of the communication device 402.

The communication device 402 may communicate with at least one unit controller 426 and may access other servers or other communication devices similar to communication device 402 via a network 428. The system bus 416 may be coupled to the network 428 by a network interface 430. The network interface 430 may be a modem, Ethernet card, router, gateway, or the like for coupling to the network 428. The coupling may be a wired or wireless connection. The network 428 may be the Internet, private network, an intranet, or the like.

The at least one unit controller 426 may also include a system memory 432 that may include a file system, ROM, RAM, and the like. The system memory 432 may include an operating system 434 similar to operating system 406 in communication devices 402. The system memory 432 may also include data structures 436 for optimally determining the extraction port 120*a-f*. The data structures 436 may include operations similar to those described with respect to the method 200 for optimally determining the extraction port 120a-f. The server system memory 432 may also include other files 438, applications, modules, and the like.

The at least one unit controller 426 may also include a processor or a processing unit 442 to control operation of other devices in the at least one unit controller 426. The at least one unit controller 426 may also include I/O device 444. The I/O devices 444 may be similar to I/O devices 418 of communication devices 402. The at least one unit controller 426 may further include other devices 446, such as a monitor or the like to provide an interface along with the I/O devices 444 to the at least one unit controller 426. The at least one unit controller 426 may also include a hard disk drive 448. A system bus 450 may connect the different components of the at least one unit controller 426. A network interface 452 may couple the at least one unit controller 426 to the network 428 via the system bus 450.

The flowcharts and step diagrams in the figures illustrate the architecture, functionality, and operation of possible implementations of systems, methods, and computer program products according to an embodiments of the present invention. In this regard, each step in the flowchart or step diagrams may represent a module, segment, or portion of code, which comprises one or more executable instructions for implementing the specified logical functions. It should also be noted that, in some alternative implementations, the functions noted in the step may occur out of the order noted in the Figures. For example, two steps shown in succession may, in fact, be executed substantially concurrently, or the steps may sometimes be executed in the reverse order, depending upon the functionality involved. It will also be noted that each step of the step diagrams and/or flowchart illustration, and combinations of steps in the step diagrams and/or flowchart illustration, can be implemented by special purpose hardware-based systems which perform the specified functions or acts, or combinations of special purpose hardware and computer instructions.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of improving the turndown efficiency of a turbomachine, the method comprising:
   providing a turbomachine comprising an extraction system comprising a plurality of ports;
   determining an extraction load requirement that comprises a physical requirement of a fluid extracted from the turbomachine by the extraction system;
   determining a turbomachine load requirement; and
   selecting an optimum port from the plurality of ports;
   wherein the step of determining the optimum port comprises: utilizing data on the turbomachine load requirement; and wherein the extraction load requirement is determined by an independent process, which is independent from the turbomachine load requirement.

2. The method of claim 1 further comprising continuously selecting the optimum port while the turbomachine is in operation.

3. The method of claim 2, wherein the turbomachine comprises a steam turbine.

4. The method of claim 3, wherein the extraction system removes a portion of the steam flowing through the steam turbine.

5. The method of claim 4, wherein the physical requirement comprises at least one of: a pressure, a temperature, a flow rate, or combinations thereof.

6. The method of claim 2, further comprising utilizing a cascading process to: determine which of the plurality of ports to use in order to meet the turbomachine load requirement and the extraction load requirement.

7. The method of claim 6, wherein the cascading process is continuously performed while the turbomachine operates.

8. A method for reducing the impact on performance of a power-plant, the method comprising:
   providing a power-plant comprising a steam power-plant, wherein the steam power-plant is integrated with an extraction system configured for transferring steam from the steam plant to an independent process, wherein the extraction system comprises a plurality of ports;
   determining an extraction load requirement that comprises a physical requirement of the steam extracted from the steam power-plant by the extraction system;
   determining an energy demand of the steam plant; and
   selecting a port from the plurality of ports for extracting the steam;
   wherein the step of selecting the port comprises: utilizing data on the energy demand and the extraction load requirement; and wherein the extraction load requirement is determined by the independent process, which is operationally distinct from the energy demand.

9. The method of claim 8 further comprising continuously selecting the optimum port while the extraction system is in operation.

10. The method of claim 9, wherein an extraction port of the extraction system is located on a steam turbine of the steam power-plant.

11. The method of claim 10, wherein the physical requirement comprises at least one of: a pressure, a temperature, a flow rate, or combinations thereof.

12. The method of claim 9, further comprising utilizing a cascading process to: determine which of the multiple extraction ports to use in order to meet the energy demand and the extraction load demand.

13. The method of claim 12, further comprising continuously performing the cascading process as the steam plant operates.

14. The method of claim 12, wherein the physical requirement comprises: a constant pressure of the extracted steam.

15. The method of claim 14, further comprising determining which of the plurality of ports allows for providing the extracted steam at the constant pressure and has the least impact of the performance of the steam turbine.

16. A system for increasing a turndown efficiency of a turbomachine, the system comprising:
   a turbomachine comprising an extraction system, wherein the extraction system comprises multiple extraction ports located throughout the turbomachine; and
   a control system configured for performing the steps of:
      determining an extraction load requirement that comprises a physical requirement of a fluid extracted from the turbomachine by the extraction system;
      determining a load requirement of the turbomachine; and
      selecting an optimum port of the multiple extraction ports;
   wherein the step of selecting the optimum port comprises: utilizing data on the load requirement; and wherein the extraction load requirement is determined by an extraction process, which is independent from the turbomachine load requirement.

17. The system of claim 16, wherein the turbomachine comprises a steam turbine.

18. The system of claim 17, wherein the extraction system removes a portion of the steam flowing in a steam path associated with the steam turbine.

19. The system of claim 18, wherein the control system further performs the step of utilizing a cascading process to determine which of the multiple extraction ports to use in order to meet the load requirement and the extraction load requirement.

20. The system of claim 19, wherein the control system further performs the steps of continuously operating the cascading process while the steam turbine is in operation.

* * * * *